(12) United States Patent
Lange

(10) Patent No.: US 9,033,312 B2
(45) Date of Patent: May 19, 2015

(54) SIDE VALVE

(75) Inventor: Lutz Lange, Luedenscheid (DE)

(73) Assignee: Fluehs Drehtechnik GmbH, Luedenscheid (DE)

( * ) Notice: Subject to any disclaimer, the term of this patent is extended or adjusted under 35 U.S.C. 154(b) by 643 days.

(21) Appl. No.: 13/309,023

(22) Filed: Dec. 1, 2011

(65) Prior Publication Data

US 2012/0138838 A1 Jun. 7, 2012

(30) Foreign Application Priority Data

Dec. 2, 2010 (EP) .................................... 10015229

(51) Int. Cl.
*F16K 27/04* (2006.01)
(52) U.S. Cl.
CPC .................................. *F16K 27/045* (2013.01)
(58) Field of Classification Search
CPC .............................. F16K 27/045; F16K 27/003
USPC .......... 251/366–367, 900, 286, 344; 137/801, 137/625.46, 876, 454.5, 454.6
See application file for complete search history.

(56) References Cited

U.S. PATENT DOCUMENTS

| 4,004,775 A | * | 1/1977 | Jones et al. | ................... 251/310 |
| 5,901,735 A | | 5/1999 | Breda | |
| 2006/0016487 A1 | | 1/2006 | Lin | |
| 2009/0078904 A1 | | 3/2009 | Lange | |

FOREIGN PATENT DOCUMENTS

| DE | 32 07 895 | 9/1983 |
| DE | 87 03 969 | 5/1987 |
| DE | 202 19 008 | 4/2004 |
| DE | 10 2007 033 560 | 1/2009 |
| EP | 2 042 791 | 4/2009 |

OTHER PUBLICATIONS

European Search Report dated Apr. 28, 2011 in European Patent Application No. EP 10 01 5229, with English translation of relevant parts.

* cited by examiner

*Primary Examiner* — Marina Tietjen
(74) *Attorney, Agent, or Firm* — Collard & Roe, P.C.

(57) ABSTRACT

A side valve having a lateral connector, comprising an outer sleeve and an inner sleeve that has an attachment section for attachment on the outer sleeve side, as well as a connector piece for connecting to a water supply. The outer sleeve and inner sleeve are connected with one another by way of a separate connection piece, onto which the connector is formed.

8 Claims, 4 Drawing Sheets

Fig. 6
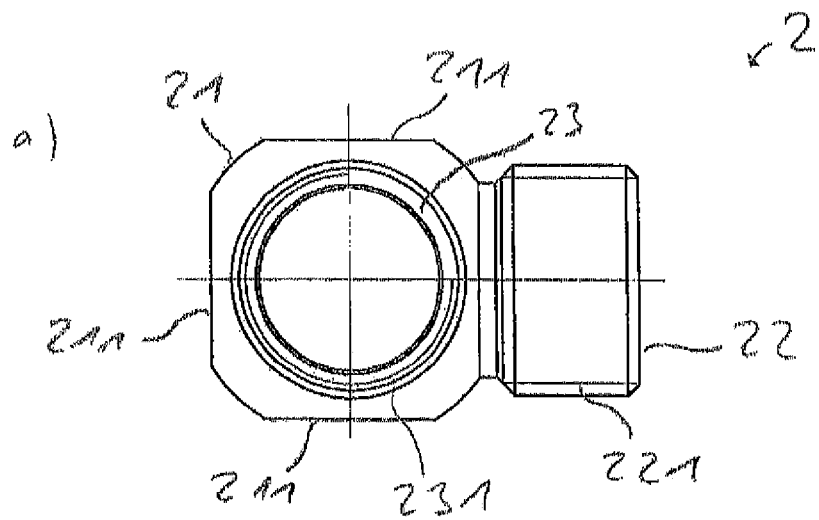
a)
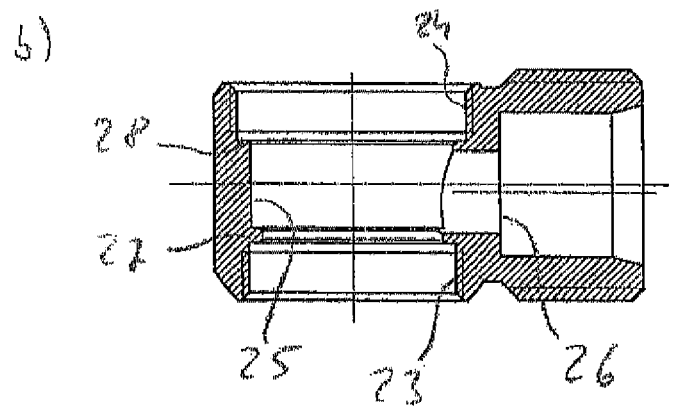
b)
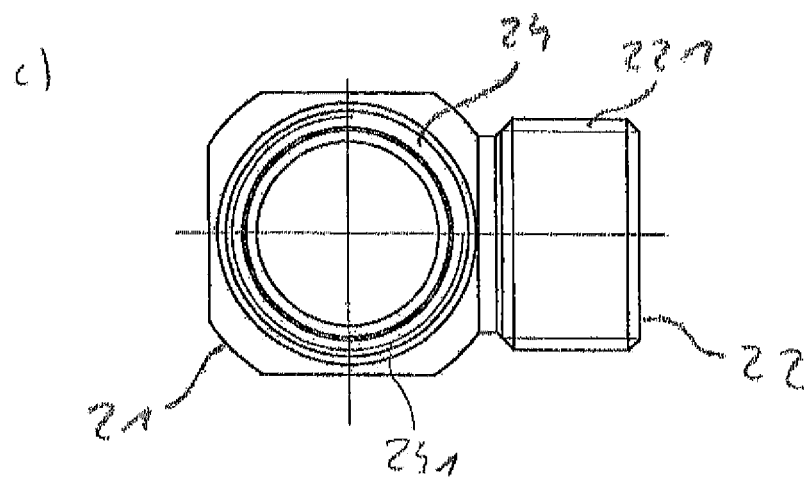
c)

SIDE VALVE

CROSS REFERENCE TO RELATED APPLICATIONS

Applicant claims priority under 35 U.S.C. §119 of European Application No. 10015229.7 filed Dec. 2, 2010, the disclosure of which is incorporated by reference.

BACKGROUND OF THE INVENTION

1. Field of the Invention

The invention relates to a side valve having a lateral connector and comprising an outer sleeve and an inner sleeve that has an attachment section for attachment on the outer sleeve side, as well as a connector piece for connecting to a water supply.

2. The Prior Art

Exit of media from fittings, with simultaneous deflection of the flow direction, is controlled using side valves. Known side valves comprise an outer sleeve, into which connectors are affixed laterally, as well as an inner sleeve that is affixed along the outer sleeve, so that an interstice is formed between inner sleeve and outer sleeve. A top valve part lies against the inner sleeve, forming a seal, by way of which part the inflow amount can be controlled. The inner sleeve as well as the connector are screwed onto the outer sleeve with the use of a sealing adhesive that is affixed onto the threaded region before the screw-in process takes place.

It is a disadvantage of the previously known side valves that the connector, which has a relatively small outside diameter, has only a slight connecting surface with the outer sleeve, and for this reason the connection between connector and outer sleeve is only conditionally reliable. For example, in the course of an installation or release process of the side valve on a water outlet, a rupture of the adhesive between connector and outer sleeve can occur, and this can cause leaks to occur.

SUMMARY OF THE INVENTION

It is therefore an object of the invention to provide a side valve of the aforementioned type, in which the connector is reliably connected with the side valve. According to the invention, this task is accomplished in that the outer sleeve and the inter sleeve are connected with one another by way of a separate connection piece, onto which the connector is formed.

With the invention, a side valve is created in which the connector is reliably connected with the side valve. One-piece shaping of the connector is made possible by providing the separate connection piece, by way of which outer sleeve and inner sleeve are connected with one another, and onto which the connector is formed. In this connection, all the parts can be produced as lathed parts, in this three-part configuration of the side valve, and this allows cost-advantageous production of the side valve from the most varied materials.

In a further development of the invention, the connection piece has a first attachment section on the inner sleeve side, for attachment of the inner sleeve, and a second attachment section on the outer sleeve side, for attachment of the outer sleeve, whereby the outer sleeve has an attachment section that corresponds to the attachment section of the connection piece on the outer sleeve side. Preferably, the attachment section on the outer sleeve side and the one on the inner sleeve side are configured as inside threads, and the attachment section of the outer sleeve as well as the attachment section of the inner sleeve are configured as outside threads. In this way, a good seal of the side valve is achieved. The outer sleeve and inner sleeve are thus enclosed by the connection piece and can easily be installed on it.

In a further embodiment of the invention, the attachment section on the outer sleeve side and the attachment section on the inner sleeve side of the connection piece delimit an intermediate surface into which a bore introduced into the connection piece projects, which bore is disposed within the lateral connector. In this way, a uniform flaw of water is achieved.

In a further development of the invention, the attachment section on the inner sleeve side and/or the attachment section on the outer sleeve side of the connection piece open into a step against which a seal rests. In this way, the seal between inner sleeve and/or outer sleeve and the connection piece is increased.

In a further embodiment of the invention, the inner sleeve has a circumferential collar on its end opposite the mounting thread. In this way, a contact surface for a sealing element of an upper valve part screwed into the outer sleeve is obtained.

In a further development of the invention, the inner sleeve has a section enlarged in its outside diameter, at a distance from the connection piece, which section is surrounded, on both sides, by sections that have a reduced outside diameter, relative to the former. In this way, good flow behavior of the water flowing through is brought about.

It is advantageous if the connection piece is configured as a one-piece lathed part. In this way, cost-advantageous production of the connection piece from the most varied materials is made possible.

In a further embodiment of the invention, the attachment section of the outer sleeve, which is preferably configured as an outside thread, is delimited by a step that forms a stop that lies against a flat surface that surrounds the attachment section of the connection piece on the side of the outer sleeve, preferably configured as an inside thread. In this way, a great seal between outer sleeve and connection piece is achieved. Alternatively, the stop can also be formed by the face surface of the outer sleeve, which lies against a contact surface within the connection piece.

In a further embodiment of the invention, the attachment section of the inner sleeve, preferably configured as an outside thread, is delimited by a step that forms a stop that lies against a flat surface that surrounds the attachment section of the connection piece on the inner sleeve side, preferably configured as an inside thread. In this way, a good seal between inner sleeve and connection piece can be achieved. Alternatively, the stop can also be disposed in such a manner that it lies against a contact surface within the connection piece.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 2 shows detail II of the side valve from FIG. 1a;

FIG. 6a shows the connection piece of the side valve from FIG. 1 in a view from below, FIG. 6b shows the connection piece in sectional representation; and FIG. 6c shows the connection piece in a view from above.

DETAILED DESCRIPTION OF THE PREFERRED EMBODIMENT

Figure 1:
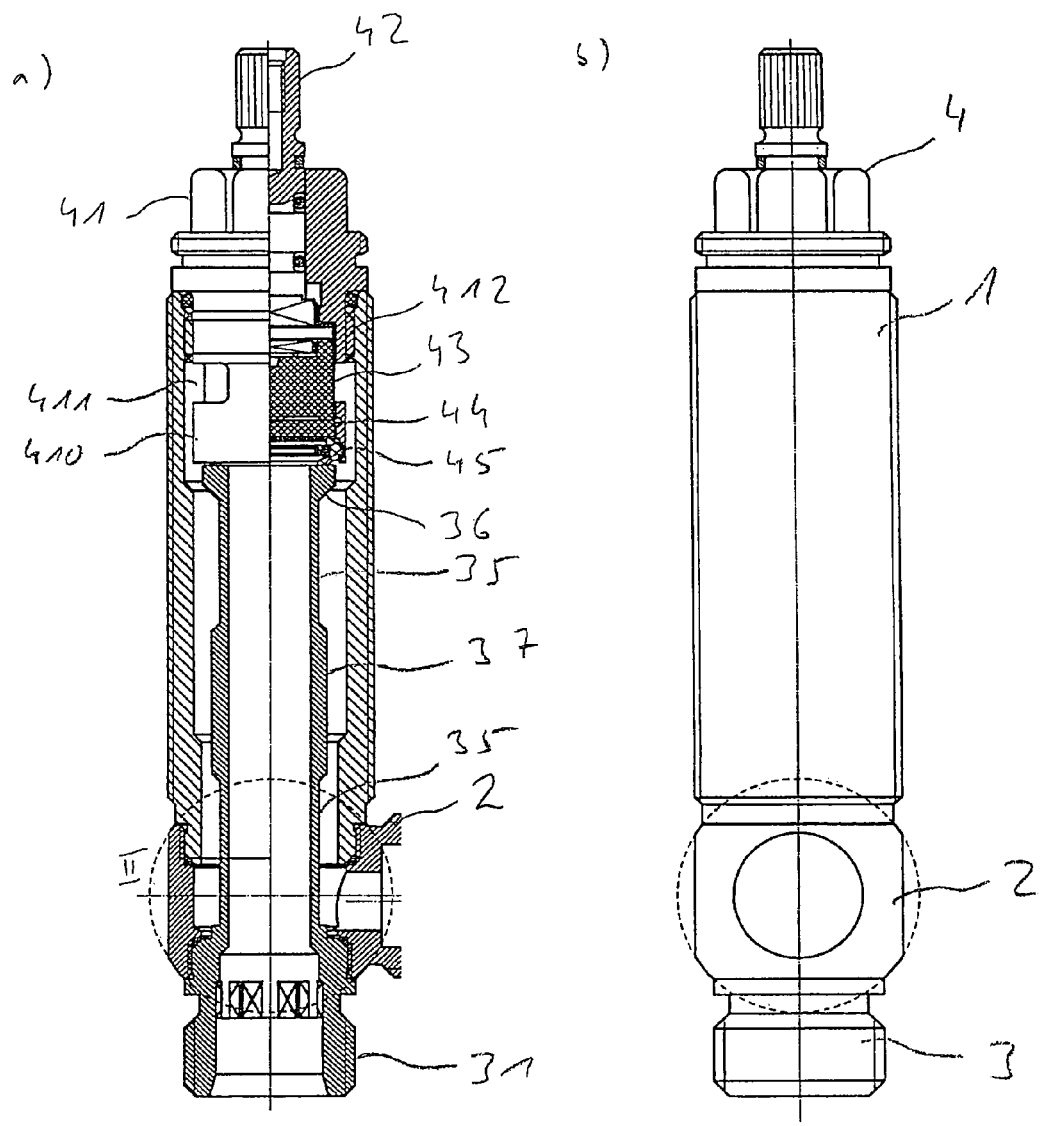
FIG. 1a shows a partial sectional representation of one embodiment of a side valve according to the invention.
FIG. 1b shows the side valve of FIG. 1 in a side view.
Figure 2:
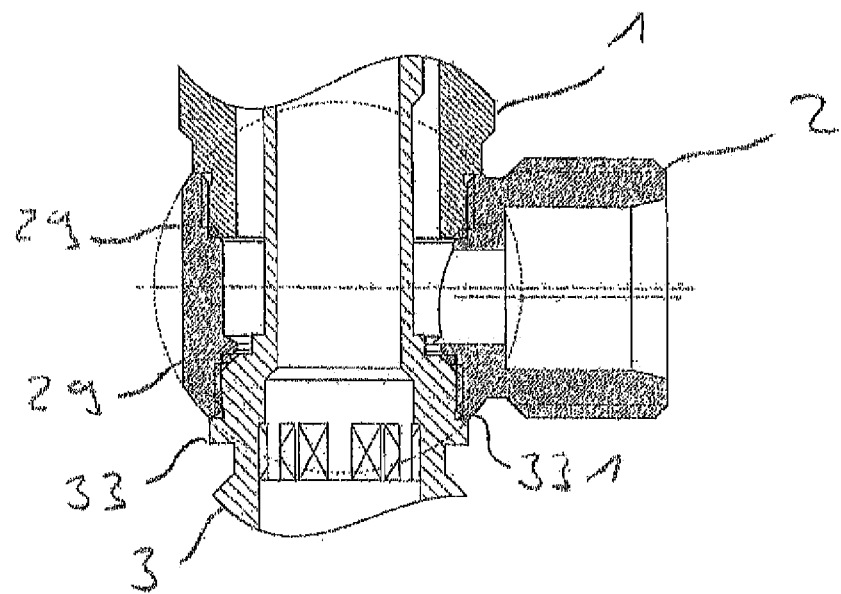
Figure 3:
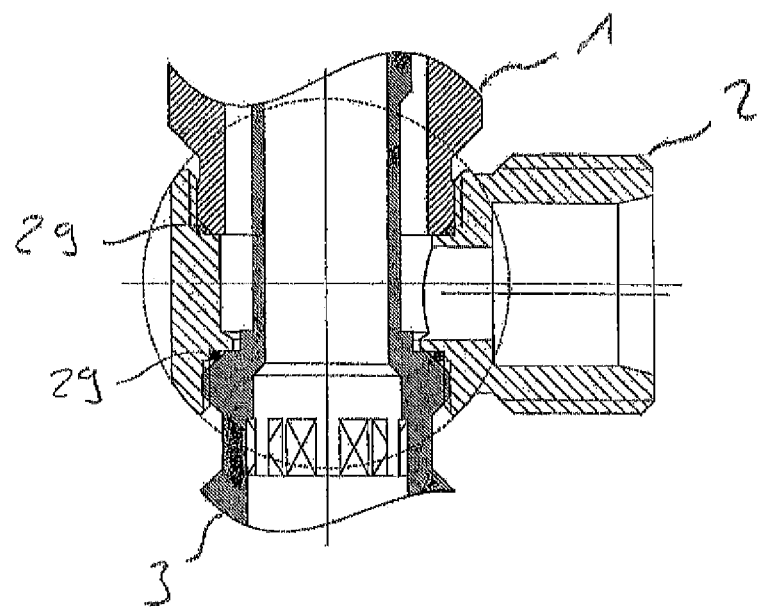
FIG. 3 shows a detail of the side valve corresponding to FIG. 2 of a side valve having stops of the inner and outer sleeve displaced inward within the connection piece.
Figure 4:
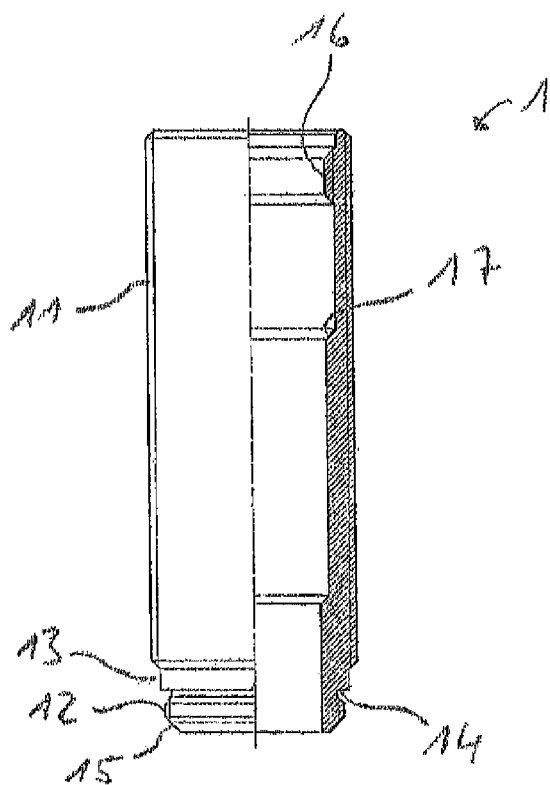
FIG. 4 shows the representation of the outer sleeve of the side valve from FIG. 1 in partial section.
Figure 5:
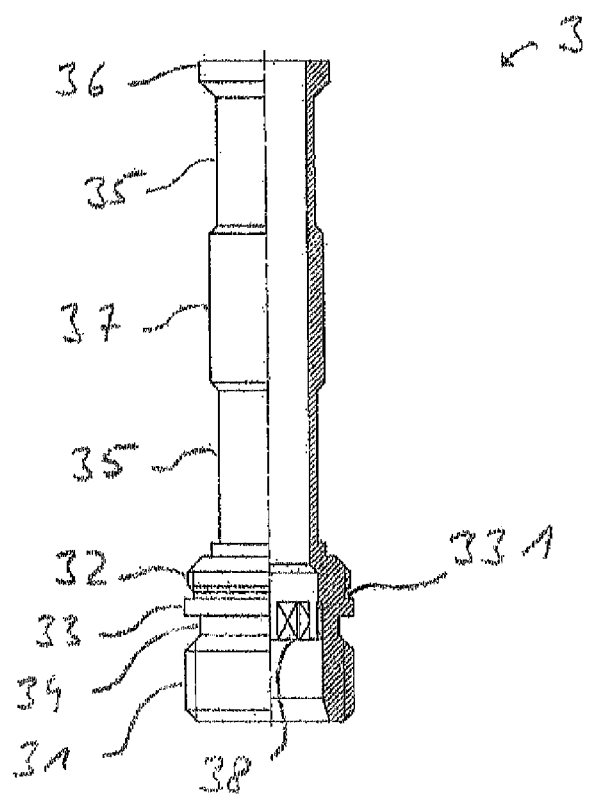
FIG. 5 shows the representation of the inner sleeve of the side valve in partial section.

The embodiment of the side valve shown in the drawings essentially consists of an outer sleeve 1 and an inner sleeve 3 that are connected with one another by way of a connection piece 2, as well as an upper valve part 4.

In the exemplary embodiment, the outer sleeve 1 is produced from brass and configured essentially as a hollow cylinder. Over about ⅘ of the length of the outer sleeve, an outside thread 11 is introduced in it. At a distance from the outside thread 11, a second outside thread 12 that reduces the diameter is furthermore introduced into the outer sleeve 1, whereby a step 13 is formed in between the second outside thread 12 and the first outside thread 11, by means of which step a stop 14 is formed. The second outside thread 12 opens into a bevel 15 on the end side, by means of which bevel simplified screwing-in into the connection piece 2 is made possible. Furthermore, the bevel 15 forms a sealing surface that lies against the sealing ring 29 laid against the stop 28 of the connection piece 2, forming a seal. At its end facing away from the bevel 15, an inside thread 16 is furthermore introduced on the inside of the outer sleeve 1, for attachment of an upper valve part 4. The inside diameter of the outer sleeve 1 is structured to be reduced in size by two steps 17 disposed at a distance from one another in the inner wall of the outer sleeve, in the direction of the bevel 15, in steps.

In the exemplary embodiment, the connection piece 2 is produced from brass and consists essentially of a cuff 21 onto which a connector 22 is formed. Circumferentially, three flat surfaces 211 for better handling of the connection piece 2 are formed on in the cuff 21, which is configured in the manner of a spherical section. In the cylindrical pass-through of the cuff 21, two inside threads 23, 24 are introduced on the end side, between which an intermediate surface 25 is disposed. The first inside thread 23, which is reduced in diameter in comparison with the second inside thread 24, attaches the inner sleeve 3; the second inside thread 24 attaches the outer sleeve 1 by way of the second outside thread 12 that corresponds to it. Relative to the intermediate surface 25, the first inside thread is delimited by a step 27, and the second inside thread by a step 28. The steps 27, 28 contact with a circumferential sealing ring 29. The first inside thread 23 is surrounded, on the end side, by a flat surface 231, and the second inside thread is surrounded, on the end side, by a flat surface 241. The flat surfaces 231, 241 contact outer sleeve 1 and inner sleeve 3.

The connector 22 formed onto the cuff 21 is configured essentially as a hollow cylinder, whereby a mounting thread 221 is formed into its outer mantle surface. Within the connector 22 and surrounded by it, a bore 26 is introduced into the cuff 21, which bore passes through the intermediate surface 25. In the exemplary embodiment, the connector 22 is configured as a lathed brass part.

In the exemplary embodiment, the inner sleeve 3 is also structured as a lathed brass part in the form of a hollow cylinder, to a great extent. At one end, a mounting thread 31 is introduced into the inner sleeve 3, circumferentially. In place of the mounting thread, a different connector piece, for example a bayonet closure, can also be provided. Furthermore, a screw-in thread 32 reduced in diameter is disposed at a distance from the mounting thread 31. The screw-in thread 32 is delimited, on its side facing the mounting thread 31, by a step 33 that forms a stop 331. A groove 34 is disposed between the step 33 and the mounting thread 31. On its end opposite the mounting thread 31, a circumferential collar 36 is formed onto the inner sleeve 3. A section 37 having a larger outside diameter is formed on between the collar 36 and the screw-in thread 32, at a distance from the connection piece 2, which section is surrounded, on both sides, by sections 35 having a reduced outside diameter relative to it. At the level of the groove 34, an interior hexagon 38 for handling the inner sleeve 3 is furthermore formed in the inner sleeve 3, in its inner wall.

The upper valve part 4 used in the exemplary embodiment has a head piece 41 that has a spindle 42 passing through its center and radially guided in it. A valve that comes to rest on the collar 36 of the inner sleeve 3 can be activated by way of the spindle 42. In the exemplary embodiment, the valve is formed by a control cam 43 and a pass-through disk 44. The control cam 43 is connected with the spindle 42 with shape fit. On its side of the control cam 43 that faces away from the spindle 42, the pass-through disk 44 is provided in the head piece 41, which disk is followed by a sealing element 45 that comes to rest on the collar 36 of the inner sleeve 3.

The head piece 41 consists essentially of a symmetrical hollow body whose two face surfaces are open. On its side facing the inner sleeve 3, the head piece 41 has a sleeve-like part 410. Pass-through windows 411 are provided in the part 410. Following the pass-through windows 411, the head piece 41 can be screwed into the inside thread 16 of the outer sleeve 1, on the outside, with a thread 412. After having been screwed in, the sealing element 45 lies against the collar 36 of the inner sleeve 3. Such upper valve parts are known to a person skilled in the art, for example from German Patent No. DE 3207895 C2.

In the assembly of the side valves, at first sealing rings 29 are laid against the steps 27, 28 of the cuff 21. Subsequently, the outer sleeve is screwed into the second inside thread 24 of the connection piece 2 with its second outside thread 12, which is provided with a sealing adhesive all the way to the stop 14, until the stop 14 lies against the flat surface 241. Then the inner sleeve is introduced into the outer sleeve 1 by means of the connecting piece 2, whereby the screw-in thread 32, which is also provided with a sealing adhesive all the way to the stop 331, is screwed into the first inside thread 23 of the connection piece 2, until the stop 331 lies against the flat surface 231 of the connection piece 2. When this happens, the sealing rings 29 are compressed by the outer sleeve 1 and the inner sleeve 3, thereby achieving a good sealing effect.

In the case of another embodiment—not shown—a smooth or rough insertion surface is provided in place of the inside thread 23, 24 of the connection piece 2. In this case, the connection between outer sleeve and inner sleeve, which has a corresponding smooth or rough attachment section, takes place by way of an adhesive. A connection by way of a weld or solder connection is also possible, whereby here, the attachment sections only have to have minimal dimensions. Even an attachment of outer and inner sleeve and connection piece edge to edge is possible.

The upper valve part 4 is screwed into the inside thread 16 of the outer sleeve 1 using the mounting thread 412, so that the sealing element 45 lies on the collar 36 of the inner sleeve 3, forming a seal. In this connection, the pass-through windows 411 open into the interstice formed between outer sleeve 1 and inner sleeve 3.

In the assembled state of the side valve, the medium enters into the side valve through the inner sleeve 3. When the upper valve part 4 is open, the medium passes through the pass-through windows 411 and flows in the opposite direction through the interstice formed between outer sleeve 1 and inner sleeve 3, until it exits through the bore 26 of the connection piece 2, through the connector 22.

Accordingly, while only a few embodiments of the present invention have been shown and described, it is obvious that many changes and modifications may be made thereunto without departing from the spirit and scope of the invention.

What is claimed is:

1. A side valve comprising:
    an outer sleeve;
    an inner sleeve that has an attachment section for attachment on an outer sleeve side; and
    a separate connection piece for connecting the outer sleeve and the inner sleeve with one another, said connection piece having a lateral connector piece formed thereon for connecting to a water supply, wherein an interstice for passage of medium exists between the inner sleeve and the outer sleeve, and
    an upper valve part connected to said outer sleeve and having a spindle, said spindle being configured for opening and closing the upper valve part, to regulate flow of medium through the interstice,
    wherein the connection piece has a first attachment section for attachment of the inner sleeve, and a second attachment section for attachment of the outer sleeve, wherein the outer sleeve has an attachment section that corresponds to the second attachment section of the connection piece, and
    wherein at least one of the first and second attachment sections opens into a step against which a seal rests.

2. The side valve according to claim 1, wherein the first attachment section and the second attachment section of the connection piece delimit an intermediate surface into which a bore introduced into the connection piece extends, said bore being in communication with the connector piece.

3. The side valve according to claim 1, wherein the connection piece is configured as a one-piece lathed part.

4. A side valve comprising:
    an outer sleeve;
    an inner sleeve that has an attachment section for attachment on an outer sleeve side; and
    a separate connection piece for connecting the outer sleeve and the inner sleeve with one another, said connection piece having a lateral connector piece formed thereon for connecting to a water supply, wherein an interstice for passage of medium exists between the inner sleeve and the outer sleeve, and
    an upper valve part connected to said outer sleeve and having a spindle, said spindle being configured for opening and closing the upper valve part, to regulate flow of medium through the interstice,
    wherein the inner sleeve has a mounting thread on one end and a circumferential collar on an opposite end.

5. A side valve comprising:
    an outer sleeve;
    an inner sleeve that has an attachment section for attachment on an outer sleeve side; and
    a separate connection piece for connecting the outer sleeve and the inner sleeve with one another, said connection piece having a lateral connector piece formed thereon for connecting to a water supply, wherein an interstice for passage of medium exists between the inner sleeve and the outer sleeve, and
    an upper valve part connected to said outer sleeve and having a spindle, said spindle being configured for opening and closing the upper valve part, to regulate flow of medium through the interstice,
    wherein the connection piece has a first attachment section for attachment of the inner sleeve, and a second attachment section for attachment of the outer sleeve, wherein the outer sleeve has an attachment section that corresponds to the second attachment section of the connection piece, and
    wherein the second attachment section is delimited by a step that forms a stop that lies against a flat surface that surrounds the second attachment section.

6. A side valve comprising:
    an outer sleeve;
    an inner sleeve that has an attachment section for attachment on an outer sleeve side; and
    a separate connection piece for connecting the outer sleeve and the inner sleeve with one another, said connection piece having a lateral connector piece formed thereon for connecting to a water supply, wherein an interstice for passage of medium exists between the inner sleeve and the outer sleeve, and
    an upper valve part connected to said outer sleeve and having a spindle, said spindle being configured for opening and closing the upper valve part, to regulate flow of medium through the interstice,
    wherein the connection piece has a first attachment section for attachment of the inner sleeve, and a second attachment section for attachment of the outer sleeve, wherein the outer sleeve has an attachment section that corresponds to the second attachment section of the connection piece, and
    wherein the first attachment section is delimited by a step that forms a stop that lies against a flat surface that surrounds the first attachment section.

7. A side valve comprising:
    an outer sleeve;
    an inner sleeve that has an attachment section for attachment on an outer sleeve side; and
    a separate connection piece for connecting the outer sleeve and the inner sleeve with one another, said connection piece having a lateral connector piece formed thereon for connecting to a water supply, wherein an interstice for passage of medium exists between the inner sleeve and the outer sleeve, and
    an upper valve part connected to said outer sleeve and having a spindle, said spindle being configured for opening and closing the upper valve part, to regulate flow of medium through the interstice,
    wherein the connection piece has a first attachment section for attachment of the inner sleeve, and a second attachment section for attachment of the outer sleeve, wherein the outer sleeve has an attachment section that corresponds to the second attachment section of the connection piece, and
    wherein the first attachment section of the connection piece is configured as an inside thread and wherein the inner sleeve has the attachment section configured as an outside thread that corresponds to the inside thread of the connection piece.

8. A side valve comprising:
an outer sleeve;
an inner sleeve that has an attachment section for attachment on an outer sleeve side; and
a separate connection piece for connecting the outer sleeve and the inner sleeve with one another, said connection piece having a lateral connector piece formed thereon for connecting to a water supply, wherein an interstice for passage of medium exists between the inner sleeve and the outer sleeve, and
an upper valve part connected to said outer sleeve and having a spindle, said spindle being configured for opening and closing the upper valve part, to regulate flow of medium through the interstice,
wherein the connection piece has a first attachment section for attachment of the inner sleeve, and a second attachment section for attachment of the outer sleeve, wherein the outer sleeve has an attachment section that corresponds to the second attachment section of the connection piece, and
wherein the second attachment section of the connection piece is configured as an inside thread, and the attachment section of the outer sleeve is configured as an outside thread that corresponds to the inside thread of the connection piece.

* * * * *